Figures 1, 2:
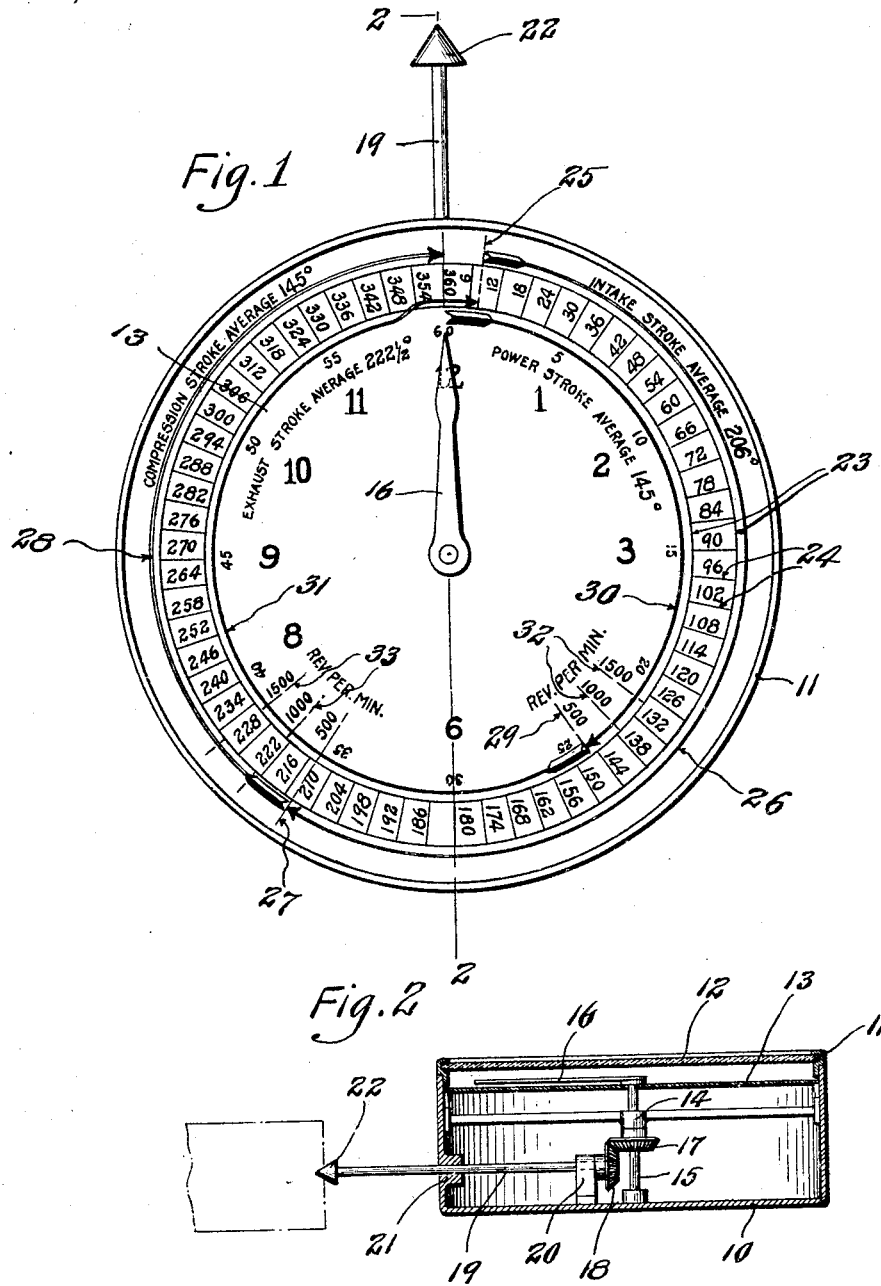

C. H. CRUM.
CYCLE METER FOR GAS ENGINES.
APPLICATION FILED JUNE 5, 1915.

1,199,053.

Patented Sept. 26, 1916.

Inventor
C. H. Crum
By F. H. Cornwall, Atty

UNITED STATES PATENT OFFICE.

CHARLES H. CRUM, OF CALIFORNIA, MISSOURI.

CYCLE-METER FOR GAS-ENGINES.

1,199,053.   Specification of Letters Patent.   Patented Sept. 26, 1916.

Application filed June 5, 1915. Serial No. 32,308.

*To all whom it may concern:*

Be it known that I, CHARLES H. CRUM, a citizen of the United States, residing at the city of California, county of Moniteau, and State of Missouri, have invented a certain new and useful Improvement in Cycle-Meters for Gas-Engines, of which the following is a full, clear, and exact description, such as will enable others skilled in the art to which it appertains to make and use the same, reference being had to the accompanying drawings, forming part of this specification.

My invention relates to a cycle meter or device for ascertaining and indicating the movements of the piston of an ordinary four-cycle internal combustion engine, the principal object of my invention being to provide a comparatively simple, inexpensive and comprehensive cycle meter which, in use, will be effective in adjusting the various strokes or movements of the piston and the movements of the valves controlling the inlet and exhaust valves.

It will be understood that all internal combustion engines of the four-cycle type require two complete revolutions of the wheel or crank shaft and two complete movements in effecting a single cycle of operation, and I propose to provide a cycle meter having a dial on which appears a circular scale marked to designate degrees from zero to three hundred sixty; to provide a hand or pointer which operates over said scale, which latter are designated to indicate the movements of the piston and valves and the arrows being of such length as to indicate the average number of degrees or time periods of operation for the piston and valves of the engine.

The dial of my improved meter is provided with the numbers from 1 to 12 inclusive, arranged after the manner of the numbers on the face of a watch or clock and the circular hand is arranged to operate clockwise over the dial, and thus it is possible for any one who can tell time to use my improved meter and ascertain whether or not an internal combustion engine of the four-cycle type is operating correctly or with the greatest degree of effectiveness.

With the foregoing and other objects in view, my invention consists in certain novel features of construction and arrangement of parts, hereinafter more fully described, claimed and illustrated in the accompanying drawings, in which—

Figure 1 is a plan view of a cycle meter of my improved construction. Fig. 2 is a sectional view taken approximately on the line 2—2 of Fig. 1.

In the construction of the device shown, 10 designates a circular casing having a permanently closed bottom and a removable top 11, the same carrying a circular section of glass 12 or other transparent material. Located within the casing immediately beneath the glass top is a dial plate 13 and arranged in the casing below this plate is a bearing 14 for a shaft 15. The upper end of this shaft extends through an opening in the center of the dial plate 13 and fixed on the upper end of said shaft is a hand or pointer 16.

Fixed on shaft 15 is a small beveled pinion 17 and meshing therewith is a corresponding beveled pinion 18 which is carried by the inner end of a shaft 19, which latter is arranged substantially at right angles to shaft 15. Shaft 19 operates in suitable bearings 20 and 21, the latter being formed in the wall of the housing 10, and positioned on the outer end of this shaft is a conical head 22 of rubber or analogous material which is adapted to be applied to the crank shaft of an engine when the meter is in use.

Appearing on the face of the dial plate 13 is a pair of lines 23 which form concentric circles and arranged between these lines is a series of short radially disposed lines 24, the same being arranged six degrees apart and marked with numbers to designate the respective number of degrees and the line which is numbered 360 is at the top of the scale or at the point which corresponds with the number 12 on the face of a time-piece. Arranged on the face of the dial in the space within this circular scale of degrees are the numbers from 1 to 12 inclusive, the same being arranged the same as upon the face of a time-piece and arranged adjacent these last mentioned numbers are the numbers 5, 10, 15 and so on up to 60, which last mentioned numbers correspond to the minute designating numerals of a time-piece. Appearing on the dial face at a point between the degree indicating lines marked 6 and 12 and at a point which will indicate approximately eight degrees is a line 25 and extending therefrom around the dial adjacent to the outer circle 23 for a distance of approximately 206 degrees is the representation of an arrow 26, the point of the head of which terminates at a line 27 which appears on the degree scale between the lines marked 210 and 216. Immediately adjacent to this arrow is printed the legend "Intake stroke, average 206°". Appearing on the face of the dial adjacent to the outer line 23 and extending from the radial line 27 to the line on the degree scale marked 360 is an arrow 28 and appearing on the face of the dial adjacent to said arrow is the legend "Compression stroke, average 145°". Appearing on the face of the dial adjacent to the inner one of the lines or circles 23 and extending from the radial line of the degree scale marked 360 to a line 29 which extends inwardly from the degree scale at a point between the lines on said scale which are marked 144 and 150 is an arrow 30 adjacent to which appears the legend "Power stroke, average 145°". Appearing on the face of the dial adjacent to the inner line or circle 23 and extending from the radial line 29 to the radial line 25 is an arrow 31 adjacent to which appears the legend "Exhaust stroke, average 222-1/2°". Appearing on the face of the dial and extending inwardly from the inner circle 23 to the right of radial line 29 are two radial lines 32 and appearing adjacent to said line 29 and the lines 32 are the numbers 500, 1000, and 1500. Immediately adjacent to the inner ends of these three lines appears the legend "Rev. per min.", being the abbreviation for "revolutions per minute". Radial line 27 is extended inward a short distance beyond the inner line or circle 23 and appearing to the left of this line is a pair of lines 33, and said last mentioned three lines are marked with the numbers 500, 1000, and 1500. Adjacent to the inner ends of said lines appears the legend "Rev. per min." being the abbreviation for "revolutions per minute".

The use of my improved cycle meter is as follows: The crank shaft of the engine to be tested is manipulated so as to position the piston at the upper end of said cylinder, and when so positioned, the crank is at dead center. The cycle meter with the hand 16 pointing to the 360 degree mark is now connected or applied to the crank shaft with the conical head 22 fitted into the center punch hole on the end of the crank shaft. The fly wheel on the crank shaft is now engaged and slowly turned and as the crank shaft is rotated, its motion will be transmitted through shaft 19 and beveled pinions 17 and 18 to shaft 15 carrying hand 16, and the latter will move clockwise over the face of the dial. It will be understood that the movement imparted to the crank shaft is comparatively slow so as to enable the operator to watch the position of the hand or pointer 16 and also watch the movements of the valves. When the hand 16 points to the mark 25 the inlet valve should commence to open and said valve should remain open until said hand has moved a distance of 206 degrees or until the hand points directly toward the mark 27. It will be understood that during this movement of the hand, that the piston is moving downwardly through the cylinder and when the hand points directly at mark 27, the inlet valve should be fully closed and at this time, the piston has started to move toward the upper end of the cylinder. Hand 16 continues to move clockwise for a distance of 145° from the mark 27 or until said hand points to mark designating 360 degrees and during this movement the piston is moving upward in the cylinder on the compression stroke. When the hand points to mark indicating 360 degrees, the timing device to produce ignition should operate and as the turning movement to the fly wheel of the engine is continued, hand 16 will move around the scale for a distance of approximately 145° to indicate the average power stroke, and when said hand points toward the mark 29 the exhaust valve should commence to open and remain open until the hand or pointer moves a distance of approximately 222½° which is the average exhaust stroke, and this brings the hand or pointer into alinement with the mark 25 at which time the exhaust valve should be fully closed and the inlet valve should commence to open.

It will be understood that if the inlet or exhaust valves do not open and close at the points indicated by the hand or pointer on the dial, the operator or person making the test will understand that the engine or the particular cylinder being tested, is not operating at maximum efficiency and consequently the valves can be regulated and adjusted.

The marks 32 and 33 are arranged to give the proper number of degrees for the intake stroke and power stroke corresponding to the speed of the engine, it being understood that an engine operating at high speed necessarily has a comparatively shorter power stroke and a comparatively longer intake stroke.

A cycle meter of my improved construction is comparatively simple and can be operated by any one who is familiar with a time-piece for the reason that the hand or pointer moves clockwise during the testing of a cylinder and its piston and the scale of degrees is arranged after the manner of the numbers indicating hours and minutes on the face of a time-piece.

The device in use is accurate, owing to the fact that it is arranged to operate directly from the crank shaft of the engine and the indicating hand moves synchronously with and makes the same number of revolutions as the crank shaft.

It is the usual practice in testing the operation of the pistons and valves of internal combustion engines to use the fly wheel as the base of calculations, but with a device of my improved construction which is operated directly from the crank shaft it is not necessary to measure the size or gage the movement of the fly wheel. In many instances, the fly wheel of an internal combustion engine is partially incased or obstructed by parts so that it is not always available for the purpose of making the proper tests, but in nearly all internal combustion engines and particularly those utilized on motor vehicles, one end of the crank shaft is exposed so that the cycle meter can be easily applied thereto.

It will be readily understood that minor changes in the size, form and construction of the various parts of my improved device can be made and substituted for those herein shown and described, without departing from the spirit of my invention, the scope of which is set forth in the appended claims.

I claim:

1. In a cycle meter, a housing, a dial plate therein, a pointer operating over said dial plate, a shaft mounted for rotation within the housing and carrying said hand, a driving member connected to said shaft and extending to the exterior of the housing, which driving member is adapted to be operated by a rotary member, the face of said dial plate being provided with a circular scale, the divisions of which are marked to indicate the degrees of a circle and there being marks on the face of said dial adjacent to said scale for designating the average number of degrees for the stroke of a four cycle internal combustion engine, part of which stroke indicating marks are utilized during the first revolution of the pointer and part during the second revolution of said pointer.

2. In a cycle meter, the combination with a dial, of a pointer arranged for operation over said dial, the latter having on its face a circular scale divided so as to indicate degrees of a complete circle, there being arcuate marks on said dial adjacent to said scale for designating the average degrees for the strokes of a four-cycle internal combustion engine, part of the stroke designating marks being utilized during the first revolution of the pointer and part during the second revolution.

3. In a cycle meter for internal combustion engines, a pointer capable of moving simultaneously and synchronously with the engine shaft, a dial over which said member moves, and said dial being provided on its face with indicia to designate the average stroke of each cycle of the engine, part of which stroke designating indicia is utilized during the first revolution of the pointer and part during the second revolution of said pointer.

4. In a cycle meter for internal combustion engines, a pointer adapted to be driven by and to operate synchronously with the crank shaft of the engine, a dial over which said member operates, said dial having on its face a scale of degrees of a circle, and indicia relating to the average number of degrees in each stroke of cycle of the engine, part of which stroke designating indicia is utilized during the first revolution of the pointer and part during the second revolution of said pointer.

In testimony whereof I hereunto affix my signature in the presence of two witnesses, this 29th day of May, 1915.

C. H. CRUM.

Witnesses:
A. J. GATTERMEIR,
WM. C. HECK.

Copies of this patent may be obtained for five cents each, by addressing the "Commissioner of Patents, Washington, D. C."